(12) United States Patent
Aupperle et al.

(10) Patent No.: US 7,499,879 B2
(45) Date of Patent: Mar. 3, 2009

(54) COOPERATIVE E-BUSINESS COMPLEX

(75) Inventors: Bryan E. Aupperle, Apex, NC (US);
Sajan K. Sankaran, Raleigh, NC (US);
Spencer H Shepard, IV, Durham, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1499 days.

(21) Appl. No.: 10/060,996

(22) Filed: Jan. 30, 2002

(65) Prior Publication Data
US 2003/0144915 A1 Jul. 31, 2003

(51) Int. Cl.
*G06Q 30/00* (2006.01)
(52) U.S. Cl. .............................. 705/26; 705/19; 705/27
(58) Field of Classification Search ................... 705/26, 705/27, 80, 19
See application file for complete search history.

(56) References Cited

U.S. PATENT DOCUMENTS

| | | | | |
|---|---|---|---|---|
| 4,947,028 | A | 8/1990 | Gorog | 235/381 |
| 4,992,940 | A | 2/1991 | Dworkin | 364/401 |
| 5,826,244 | A * | 10/1998 | Huberman | 705/37 |
| 5,890,137 | A | 3/1999 | Koreeda | 705/26 |
| 5,940,807 | A | 8/1999 | Purcell | 705/26 |
| 6,009,413 | A | 12/1999 | Webber et al. | 705/26 |
| 6,029,141 | A * | 2/2000 | Bezos et al. | 705/27 |
| 6,128,600 | A | 10/2000 | Imamura et al. | 705/27 |
| 6,338,050 | B1 * | 1/2002 | Conklin et al. | 705/80 |
| 2001/0037230 | A1 * | 11/2001 | Raveis et al. | 705/9 |
| 2002/0078016 | A1 * | 6/2002 | Lium et al. | 707/1 |

(Continued)

FOREIGN PATENT DOCUMENTS

JP  2001067418  6/1996

(Continued)

OTHER PUBLICATIONS

*IBM Delivers Websphere Commerce Suite For Service Providers, Websphere* 2000 Miami, Florida, <http://www2.software.ibm.com/casestudies/swcs.nsf/customername/441953EE8F4E59EF0025...>, (Dec. 12, 2001).

(Continued)

*Primary Examiner*—Yogesh C Garg
(74) *Attorney, Agent, or Firm*—Jeanine Ray-Yarletts, Esq.; Steven M. Greenberg, Esq.; Carey Rodriguez Greenberg & Paul LLP

(57) ABSTRACT

A cooperative e-business complex. The cooperative e-business complex can include one or more electronically accessible e-business complex management services configured to handle e-business processing in the e-business complex on behalf of electronically associated virtual store operators, vendors, business partners and professional services providers. A virtual management office can be included which is configured to coordinate e-business transactions between the associated virtual store operators, the on-line shoppers, the vendors, the business partners, and the professional services providers in the e-business complex. Finally, one or more e-business complex management services requesters can be configured to remotely invoke selected ones of the electronically accessible e-business complex management services. Each e-business complex management services requester can invoke the electronically accessible e-business complex management services on behalf of one of the associated virtual store operators, vendors, business partners and professional services providers.

6 Claims, 11 Drawing Sheets

U.S. PATENT DOCUMENTS

| | | | |
|---|---|---|---|
| 2002/0120554 A1* | 8/2002 | Vega | 705/37 |
| 2002/0133410 A1* | 9/2002 | Hermreck et al. | 705/19 |
| 2002/0138360 A1* | 9/2002 | Inoue et al. | 705/26 |
| 2002/0156688 A1* | 10/2002 | Horn et al. | 705/26 |
| 2003/0093321 A1* | 5/2003 | Bodmer et al. | 705/26 |
| 2005/0187866 A1* | 8/2005 | Lee | 705/39 |

FOREIGN PATENT DOCUMENTS

| | | |
|---|---|---|
| JP | 9330360 | 12/1997 |
| JP | 20222487 | 8/2000 |
| WO | WO 99/50771 | 10/1999 |
| WO | WO 00/45252 | 8/2000 |
| WO | WO 00/72115 | 11/2000 |
| WO | WO 01/01313 | 1/2001 |
| WO | WO 01/22282 | 3/2001 |
| WO | WO 01/27838 | 4/2001 |

OTHER PUBLICATIONS

B. Sleeper, *The Stencil Scope, Defining Web.Servies*, The Stencil Group (Jun. 2001).

* cited by examiner

COOPERATIVE E-BUSINESS COMPLEX

BACKGROUND OF THE INVENTION

1. Statement of the Technical Field

The present invention relates to the field of electronic commerce (e-commerce) data processing systems and more particularly to a cooperative electronic business (e-business) complex.

2. Description of the Related Art

The advent and refinement of the Internet and more particularly, the World Wide Web (the "Web"), has provided a unique foundation upon which on-line commerce opportunities have rapidly developed. At the time of the popularization of the Web, conventional business-to-consumer and consumer-to-consumer firms recognized the ease in which potential customers could access data and conduct transactions over the Internet. As a result, such firms developed sophisticated electronic virtual store fronts through which commerce could be conducted either as a substitute for or an enhancement to more conventional "brick and mortar" operations.

In a virtual store, as in a conventional store, images and descriptions products are presented to potential customers, albeit electronically, in consequence of which the potential customers can select individual products for purchase. In order to consummate a purchase transaction, the virtual store can collect payment information from the customer and can confirm payment with a third party credit provider as is well known in the art. Still, as analogously recognized in the conventional retail industry, operating an individual virtual store can prove difficult inasmuch as the infrastructure necessary to support the virtual store can be complex and expensive to acquire and maintain. In particular, marketing, payment processing, inventory management, vendor relationship management and distribution often can inhibit one's entrance into the retail sector.

In the conventional retail environment, individual store owners have been able to overcome the infrastructure obstacle through cooperative measures. Specifically, for decades individual store owners have banded together in shopping malls through which at least a portion of the infrastructure can be provided and managed for the benefit of all stores housed therein. In the shopping mall environment, retail elements such as marketing and store space maintenance are collectively shared by all stores in the mall. Notably, similar attempts at collective sharing of retail infrastructure are reflected in cooperative business processing systems such as the online "virtual mall".

In the virtual mall, shoppers can access associated virtual stores through a common point of entry such as a Web portal. Initially, virtual malls were limited to industry specific virtual stores carrying industry specific products such as travel-related products. In many cases, virtual malls bypassed the virtual store entirely and merely presented the products of each individual virtual store in the virtual mall in the absence of the virtual store. In this regard, many would argue that the virtual mall itself became the virtual store.

More recently, however, virtual malls have expanded to include a wide variety of products offered through actual virtual stores. Still, conventional virtual malls simply behave as front-end portals for associated virtual stores. All infrastructure necessary to operate each virtual store must be managed by each respective virtual store, save for some common marketing efforts set forth by the virtual mall itself. FIG. 1 is a pictorial representation of a conventional virtual store arrangement which can be linked to a conventional virtual mall. In particular, the virtual store arrangement of FIG. 1 can be an implementation of the Websphere®) Commerce Suite for Service Providers® manufactured by International Business Machines Corporation of Armonk, N.Y., USA.

In the conventional virtual store arrangement of FIG. 1, shoppers 102 can access the virtual store 104 over the Internet 110. The virtual store 104 can include a commerce server 114 and an application server 112. The commerce server 114 in conjunction with a conventional database server 108 can provide front-end processing for the shoppers 102 and can include runtime shopping services, a merchandise subsystem, an ordering subsystem, a user subsystem and security services. Back-end business logic can be performed in the application server and can include "hard-wired" links to external systems 106 such as ERP/legacy systems, payment processing systems, market intelligence systems and other partner systems.

In a conventional virtual mall arrangement, each virtual store 104 can be linked together in a virtual mall as suggested in FIGS. 20 and 21 of U.S. Pat. No. 5,890,137 to Koreeda for ON-LINE SHOPPING SYSTEM AND THE METHOD OF PAYMENT SETTLEMENT. Yet, the loose association of many virtual stores in a virtual mall fails to capitalize even upon the collective efficiencies normally associated with a conventional shopping mall. In particular, in the conventional virtual mall, individual virtual stores still must maintain their own e-commerce infrastructure including the maintenance of buyer and seller networks, system administration and maintenance, external payment processing services, shipping logistics, market analysis, storefront development and other partner services. In fact, in the conventional virtual mall, even marketing remains a task whose responsibility belongs to each virtual store.

Notably, the conduct of commerce on the Internet has grown from the operation of simplistic virtual malls to the use of the Internet as an e-business platform for conducting business-to-business, e-commerce and e-marketplace transactions among parties associated with differing network and system infrastructures. Participants in these electronic exchanges require fast and simple mechanisms through which applications in each exchange can communicate. To address the needs of e-business, "Web services" technology has become a rapidly-emerging mechanism for distributed application integration.

Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols. Conceptually, Web services represent a model in which discrete tasks within e-business processes are distributed widely throughout a value net. Notably, many industry experts consider the service-oriented Web services initiative to be the next evolutionary phase of the Internet.

SUMMARY OF THE INVENTION

The present invention is a cooperative e-business complex which can provide a common e-business infrastructure for participating virtual stores, vendors, and service providers in a cooperative e-business environment, for instance a virtual mall. In one aspect of the present invention, a cooperative e-business complex, including a virtual mall, can be configured using the common e-business infrastructure of the present invention. In particular, a cooperative e-business complex can include centralized virtual mall management, access portals, cooperative processing and distributed professional services while hosting virtual stores in the virtual mall.

In consequence, an improved virtual mall environment can be provided which can facilitate virtual store participation through reduced start-up costs and complexity and further reduced operating costs and complexity. Furthermore, the cooperative nature of the e-business complex of the present invention can promote trading opportunities among store operators, vendors and business partners. Still, the invention is not limited merely to a virtual mall. Rather, as it will appear to one skilled in the art, the e-business complex can coordinate the execution of a business-to-business transaction among multiple Web services provided by corresponding participants in the virtual business complex.

A cooperative e-business complex which has been configured in accordance with the present invention can include an e-business complex entrance through which virtual stores can be accessed by on-line shoppers; and, one or more electronically accessible e-business complex management services configured to handle e-business processing in the e-business complex on behalf of electronically associated virtual store operators, vendors, business partners and professional services providers. A virtual management office can be included which is configured to coordinate e-business transactions between the associated virtual store operators, the on-line shoppers, the vendors, the business partners, and the professional services providers in the e-business complex.

Importantly, an e-business complex management services requester can be provided to each of the virtual store operators, vendors, business partners and professional service providers. Each e-business complex management services requester can be configured to remotely invoke selected ones of the electronically accessible e-business complex management services. More particularly, each e-business complex management services requester can invoke selected ones of the electronically accessible e-business complex management services on behalf of one of the associated virtual store operators, vendors, business partners and professional services providers. Significantly, the e-business complex management services can be centrally managed services for processing e-business transactions which otherwise would be performed by the respective virtual store operators, vendors, business partners and professional service providers.

The e-business complex management services also can include a programmatic extension to at least one of the e-business complex management services requesters. In one aspect of the invention, the extension can provide a query interface to products offered for sale by an associated store operator in a corresponding virtual store. Also, a browsable catalog subsystem can be provided which is configured to provide access to the on-line shoppers to browse products specified by the query interface. In another aspect of the invention, the extension can provide a real-time order processing service for processing orders in real time which are received from the management office.

A method of cooperatively processing e-business transactions in an e-business complex can include registering one or more virtual store operators with the e-business complex, each registration establishing a virtual store in the e-business complex; providing to individual ones of on-line shoppers in the e-business complex, window displays of products offered for sale by virtual stores in the e-business complex, and accepting shopper orders for the products from the individual on-line shoppers. Subsequently, selected store operators can be asynchronously notified of the shopper orders, the selected store operators operating virtual stores in the e-business complex which correspond to the products ordered by the on-line shoppers. Similarly, selected vendors can be notified of the shopper orders, the selected vendors supplying the products offered for sale by the selected store operators.

When the selected vendors produce the ordered products specified in the shopper orders, the shopper orders can be fulfilled and payments can be collected for the shopper orders from the on-line shoppers. Finally, portions of the payments can be distributed to each of the vendors and the store operators. In this way, the e-business processing typically processed in individual stores in the e-business complex can be handled singly by the e-business complex and cooperatively accessed by all of the virtual stores in the e-business complex. Thus, the complexity and cost of establishing and maintaining a virtual store in a e-business complex can be remediated.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a cooperative e-business complex. The cooperative e-business complex can broker and manage e-business transactions using common resources so as to reduce the cost of each e-business transaction conducted through the cooperative e-business complex. Moreover, the cooperative e-business complex can support business-to-business and business-to-consumer transactions among participants in the e-business complex, including sales in a virtual mall. Still, the invention is not limited merely to a virtual mall, and the cooperative e-business complex can support purely business-to-business transactions through the coupling of one or more Web services distributed about a computer communications network.

In the cooperative e-business complex of the present invention, centralized e-business complex management services can coordinate, broker, manage and service not only individual virtual store operators, but also corresponding vendors, business partners and professional service providers in a cooperative e-business arrangement within a single virtual mall. Importantly, unlike prior art virtual malls, the processing flow of the e-business platform can be continuous and automated, beginning with the ordering of products or services through to the delivery of those products and services.

Importantly, while prior art virtual mall efforts are based upon a fixed relationship between individual virtual stores and their respective vendors and professional service providers, in the present invention, each of the virtual stores and vendors can be dynamically linked and re-linked fluidly within the virtual mall as the respective requirements of the virtual stores and vendors change. Furthermore, like the virtual stores and vendors, professional service providers and business partners can be dynamically integrated into the cooperative e-business complex so as to similarly capitalize upon the cooperative nature of the platform.

Figure 1:
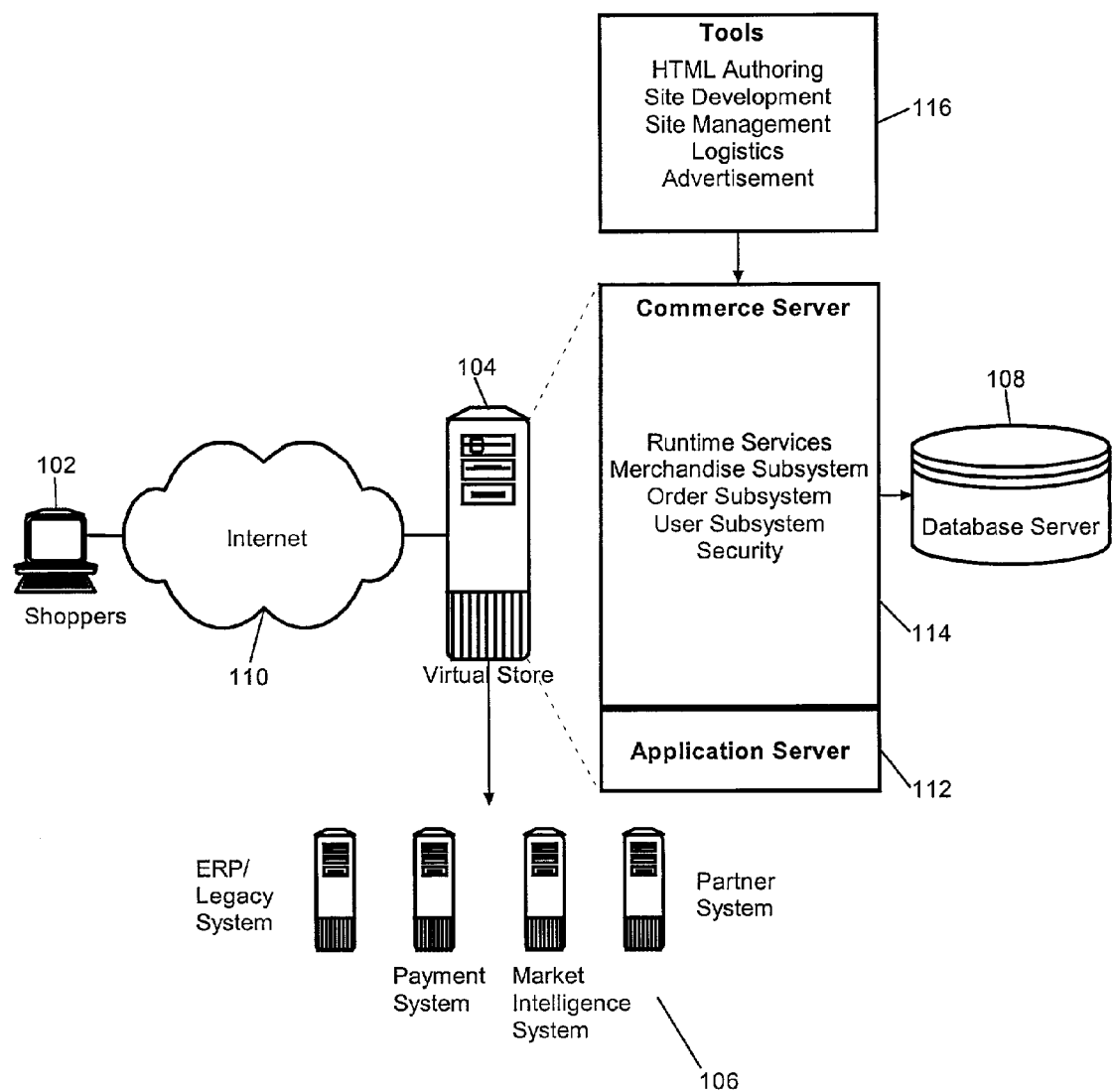
FIG. 1 is a pictorial illustration of a conventional virtual store configured for inclusion in a conventional virtual mall known in the art.
Figure 2:
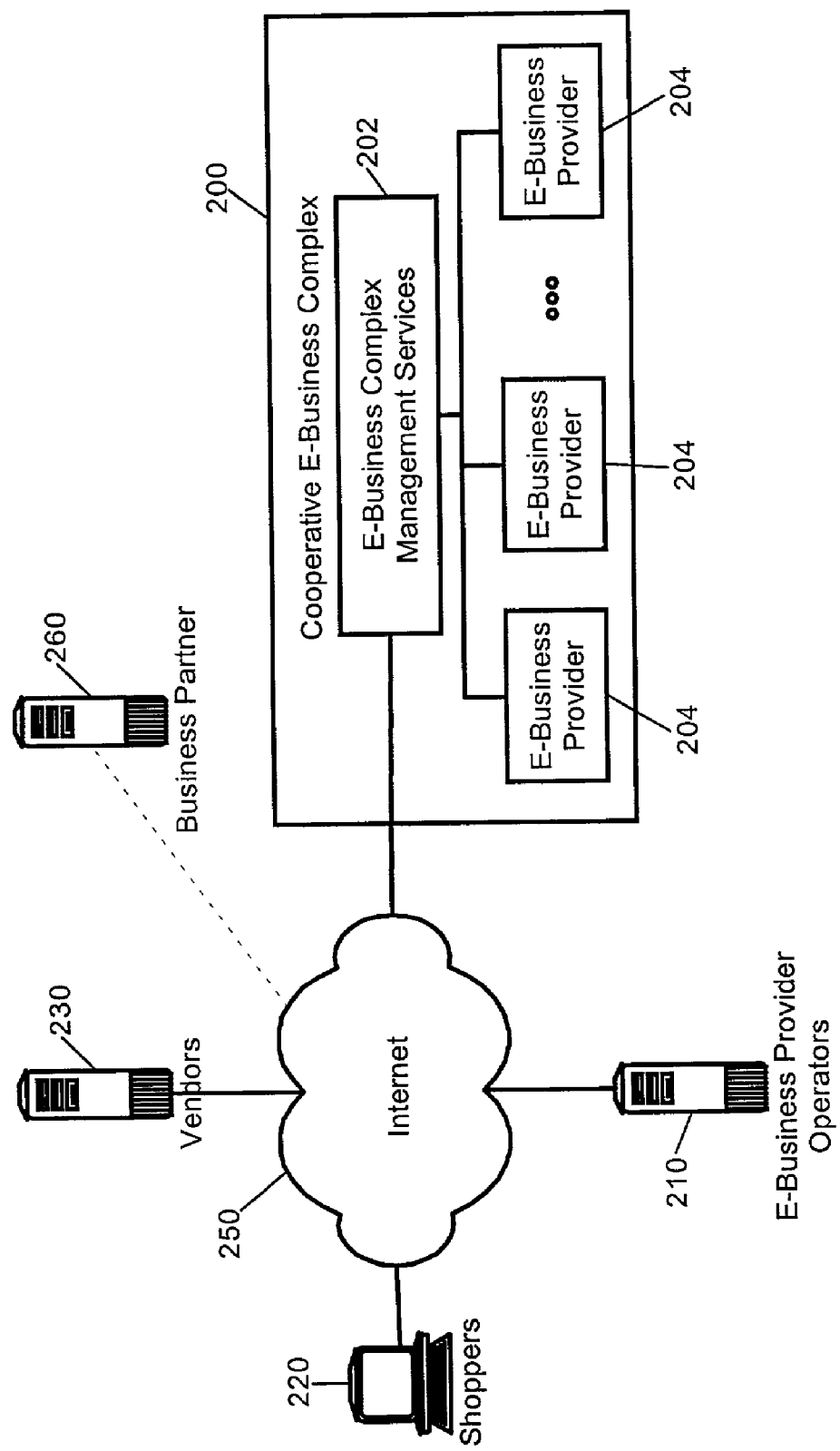
FIG. 2 is a schematic illustration of an e-business complex which has been configured for cooperative e-business processing in accordance with the inventive arrangements.

FIG. 2 is a schematic illustration of a cooperative e-business complex which has been configured for cooperative e-business processing in accordance with the inventive arrangements. A cooperative e-business complex 200 can be provided in which individual e-business provider systems 204 such as virtual stores can operate. The cooperative e-business complex 200 can include e-business complex management services 202 which can provide the infrastructure necessary for managing business-tobusiness and business-to-consumer transactions between participants in the e-business complex 200. Those services can include, but are not limited to connecting shoppers 220 to the cooperative e-business complex 200 over the Internet 250, linking each e-business provider system 204 to the shoppers 220, vendors 230 and business partners 260, and providing access for the operators 210 to their respective e-business provider systems 204 in the cooperative e-business complex.

Figure 3:
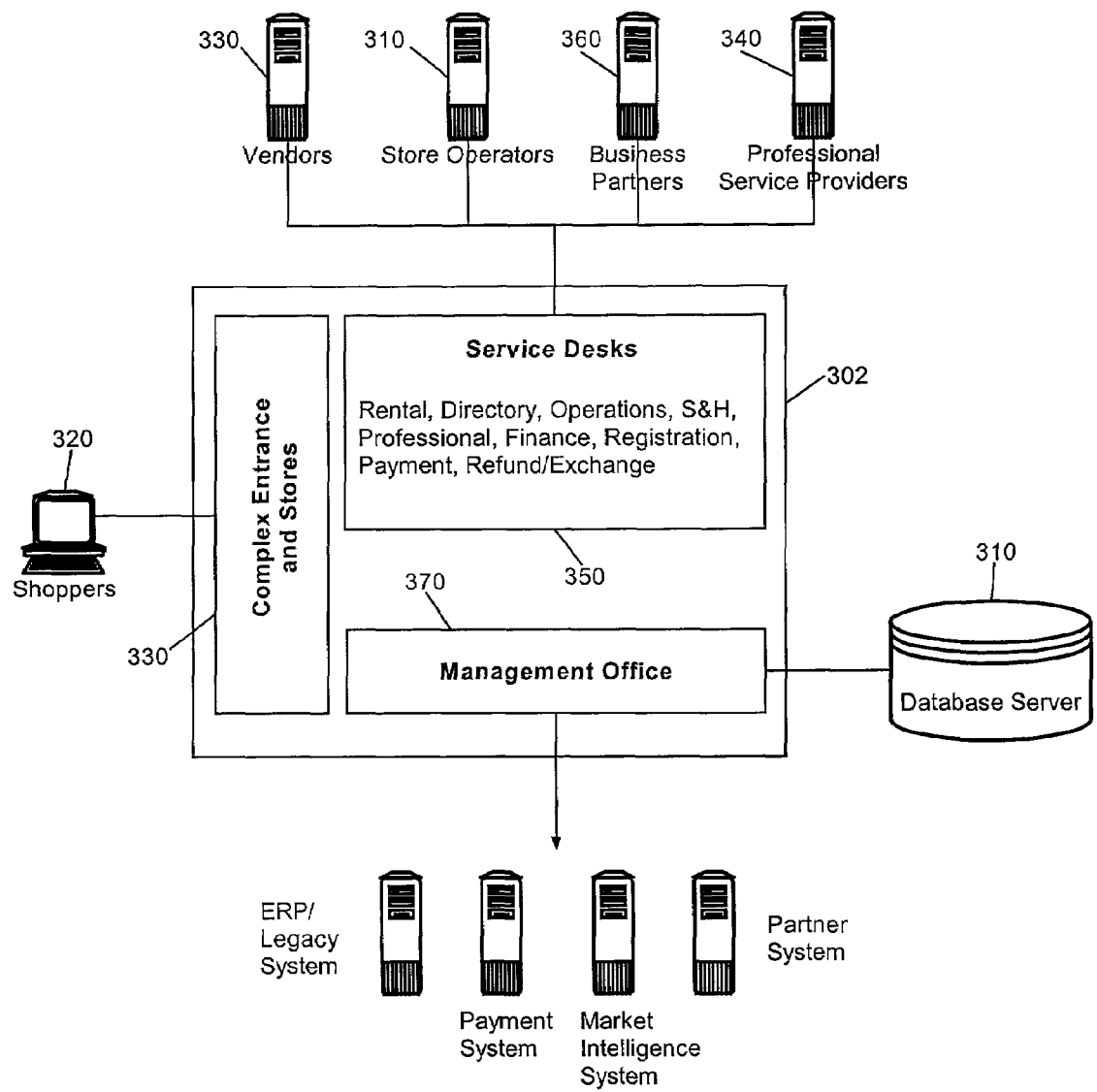
FIG. 3 is a schematic illustration of a system for providing cooperative e-business complex management services in the e-business complex of FIG. 2.

FIG. 3 schematically depicts e-business complex management services 302 which can be used to implement the e-business complex 200 of the present invention. As shown in FIG. 3, e-business complex management services 302 can coordinate business transactions between each of store operators 310, shoppers 320, vendors 330, professional service providers 340 and business partners 360 participating in the e-business complex. Specifically, the e-business complex management services 302 can include a management office 370, service desks 350, and a virtual mall entrance 330. Finally, database storage 310 can be provided in association with the e-business complex management services 302.

The service desks 350 provide the main points of interaction for the e-business complex management services 302. The service desks 350 not only can handle general order processing, but also the service desks 350 can perform tasks such as processing store rental transactions, providing a virtual mall directory, processing shipping and handling, and handling refunds and exchanges. The service desks 350 can include a series of service requester interfaces to mall service functions and can be built upon Internet request/response standards, such as Web services. In particular, the service desks 350 receive and respond to mall service requests such that the service desks 350 manage the primary business operations of the e-business complex management services 302 while remaining properly isolated therefrom. In this way, the service desks 350 can be distributed, and further can be deployed over a suite of edge servers according to a suitable high availability strategy.

Notably, the e-business complex management services 302 can act as a proxy to mall service requests, the e-business complex management services 302 routing particular requests to appropriate service desks 350. The service desks 350, in turn, either can provide the request, or can forward the request to an external provider. For instance, a request forwarded to the e-business complex management services 302 can include a request from a virtual store operator 310 to design a professional window display for a corresponding virtual store. The e-business complex management services 302 can forward the request to a suitable service desk 350 which, in turn, can forward the request to an external professional service provider 340 known to the service desk 350 as a developer of professional window displays.

The mall entrance and stores 330 both can host and provide a view to the hosted virtual stores. For each hosted virtual store, those products and services which are offered for sale by the virtual stores can be listed using a catalog mechanism provided by the underlying e-business platform. Notably, the mall entrance and stores 330 also can provide a view to a rental office in the mall, the mall entrance and stores listing available rental plans using the catalog mechanism. In accordance with the inventive arrangements, shoppers 320 can view the products and services of the virtual stores in the virtual mall through the mall entrance 330. Orders for selected products and services can be received in the mall entrance 330 and can be processed by the management office 370.

Business-to-consumer transactions conducted between the associated store operators 310 and shoppers 320 can be processed through an order and negotiation mechanism provided by the underlying e-business platform. Likewise, business-to-business transactions conducted between the store operators 310, vendors 330, business partners 360 and professional service providers 340 similarly can be processed through an order and negotiation mechanism provided by the underlying e-business platform. In that regard, the management office 370 can request specific order services from the service desks 350, including shopper authentication and payment processing.

Notably, the e-business complex management services 302 ultimately can route shopper orders for goods and services to the respective store operators 310 of the virtual stores. In this way, each store operator 310 can locally process orders before off-loading further order processing to the e-business complex management services 302. Subsequently, the e-business complex management services 302 can forward the orders to selected vendors 330 for order fulfillment. Upon notification that individual orders have been fulfilled, once again the e-business complex management services 302 can provide an opportunity for associated store operators 310 to locally process the fulfillment of the order. Finally, the e-business complex management services 302 can process shipping and handling for the ordered goods and services.

Advantageously, unlike the rigid architecture of prior art virtual malls, in the e-business complex of the present invention, individual store operators 310 can be loosely coupled not only to a virtual mall, but also to respective vendors and professional service providers, thus each of the store operators 310, vendors 330, professional service providers 340 and business partners 360 can be loosely coupled in a cooperative e-business complex. Specifically, not only can the e-business platform provide infrastructure for supporting a virtual mall, but also the e-business platform can provide infrastructure for other business-to-business transactions, not only between shopper 320 and store operator 310, but also, for example, between store operator 310 and vendor 330, store operator 310 and professional service provider 340, store operator 310 and business partner 350.

Figure 4:
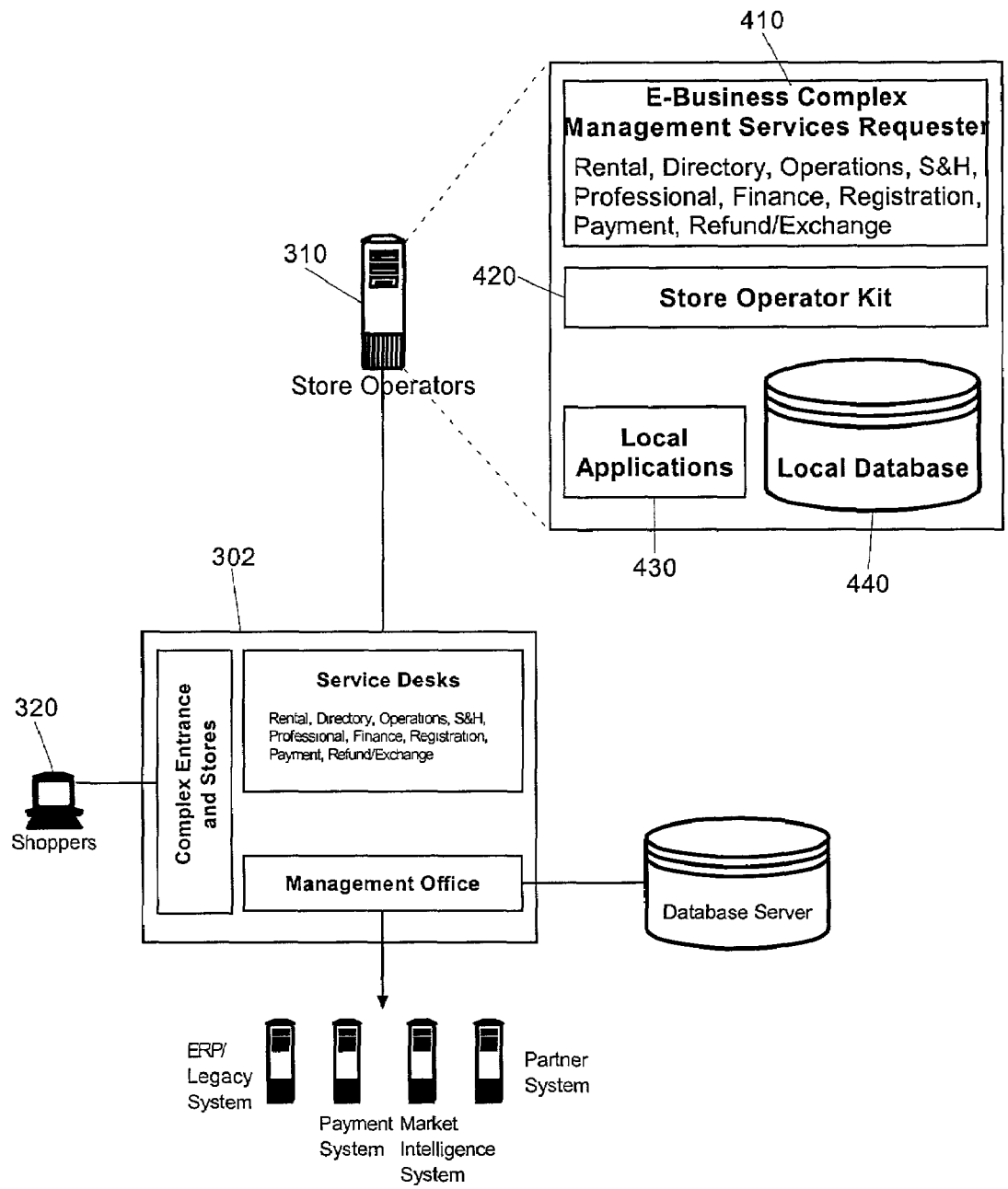
FIG. 4 is a schematic illustration of a store operator loosely coupled to the e-business complex management services of FIG. 3.

FIG. 4 is a schematic illustration of a store operator 310 configured for use with the cooperative e-business complex management services 302 of FIG. 3. As shown in FIG. 4, a store operator 310 can establish a loose coupling with the e-business complex management services 302 through a cooperative e-business complex management services requester 410. A store operator kit 420 further can provide a user interface to the cooperative e-business complex management services requester 410. Finally, the store operator kit 420 can provide a bridge between the cooperative e-business complex management services requester 410 and local applications 430 and databases 440.

The cooperative e-business complex management services requester 410 behaves as a remote interface to Web services provided by the service desks 350 of the cooperative e-business complex management services 302. Through the cooperative e-business complex management services requester 410, store operators 310 can establish a business complex presence whose management can range from depending wholly on the cooperative e-business complex management services 302, to minimally depending on the cooperative e-business complex management services 302. In particular, the level of management provided by the cooperative e-business complex management services 302 can depend upon those e-business complex services requested by the store operator 310 through the cooperative e-business complex management services requester 410.

As will be apparent to one skilled in the art, those e-business complex services which can be requested by a store operator 310 through the cooperative e-business complex management services requester 410 can correspond to those e-business complex services provided by the service desks 350 of FIG. 3. Those e-business complex services can include but are not limited to virtual space rental services, store directory services and listings, merchandise exchanges and refunds, central business operations, shipping and handling services, shopper/vendor/professional service provider registration, professional service referrals, vendor referrals, financing and credit, payment processing, mail and messaging, and promotional marketing.

The cooperative e-business complex management services requester 410 can communicate with the cooperative e-business complex management services 302 using conventional request/response communications, for example using the HTTP protocol. Specifically, the cooperative e-business complex management services requester 410 can pass requests for e-business complex services from the store operator kit 420 and can pass events received from the cooperative e-business complex management services 302 to the store operator kit 420. Through the operations service of the cooperative e-business complex management services requester 410, the cooperative e-business complex management services requester 410 can establish a fixed interval during which the store operator 210 will receive notifications of shopper orders from the operations service desk. In particular, the mall services requester 410 can send a service request message to the operations service dynamically setting the notification interval.

Importantly, the store operator kit 420 can further bridge service request/response interactions to local databases 440 and local applications 430. Still, the invention is not limited in regard to the use of a cooperative e-business complex management services requester 410 to broker service requests between the cooperative e-business complex management services 302 and the store operator 310. Rather, in an alternative embodiment, an intermediary can be used in lieu of the cooperative e-business complex management services requester 410 to generate service requests on behalf of the store operator 310. Furthermore, the invention is not limited simply to request/response communications. Rather, in other embodiments the services desk 350 can support one-way, solicit-response and notification messaging primitives.

Figure 5:
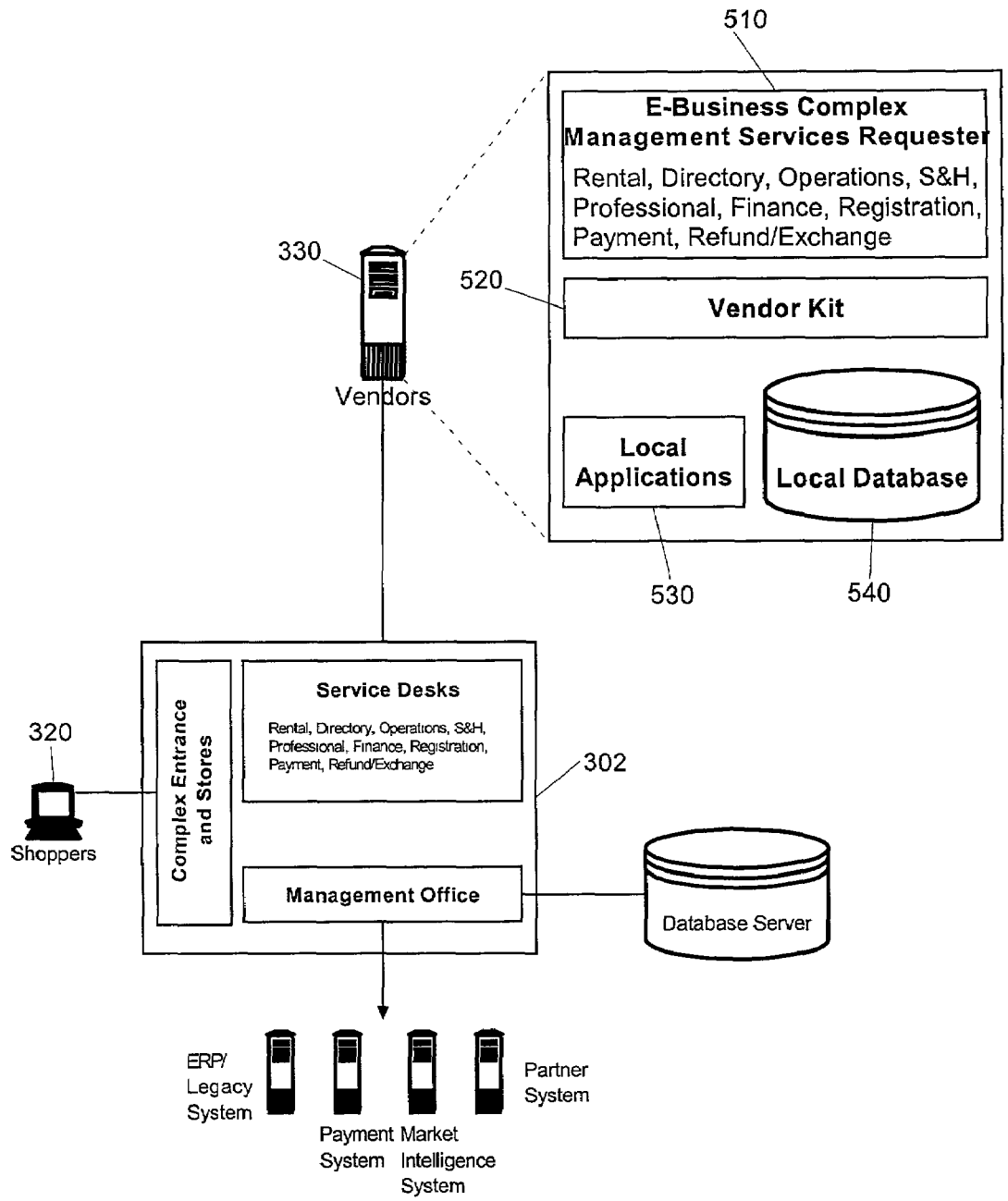
FIG. 5 is a schematic illustration of a virtual vendor loosely coupled to the e-business complex management services of FIG. 3.

Like individual store operators 310 in the e-business complex, individual vendors 330 can be loosely coupled to other participants in the cooperative e-business complex 200 of FIG. 2. FIG. 5 is a schematic illustration of a virtual vendor 330 coupled to the e-business complex management services 302 of FIG. 3. As shown in FIG. 5, a vendor 330 can establish a loose coupling with the e-business complex management services 302 through the e-business complex management services requester 510. A vendor kit 520 further can provide a user interface to the e-business complex management services requester 510. Finally, the vendor kit 520 can provide a bridge between the e-business complex management services requester 510 and local applications 530 and databases 540.

In one aspect of the invention, the vendors 330 can participate in the e-business complex 200 either as a contracted vendor or a non-contracted vendor. Contracted vendors can agree to pre-determined pricing for pre-determined merchandise, whereas non-contracted vendors are not so limited. In any case, both types of vendors can be listed in a mall directory. Furthermore, through their association with the e-business complex 200, the vendors 330 can distribute merchandise to store operators 310 through promotional campaigns targeting the store operators 310.

Importantly, by decoupling the relationship between the vendors 330 and the store operators 310, the e-business complex 200 of the present invention can simplify the number and complexity of interactions between the vendors 330 and the store operators 310. Specifically, the vendors 330 need only interact directly with the e-business complex 200 which can further coordinate interactions with the respective virtual stores of the store operators 310. Moreover, in the e-business complex 200 of the present invention, the management office 370 and not the vendors 330 can coordinate the shipment and handling of an order. Finally, the vendors 330 can interact with multiple e-business complexes, for instance multiple virtual malls, thereby expanding the scope of efficiencies enjoyed by the vendors 330 in accordance with the present invention.

As in the case of the e-business complex management services requester 410. of the store operators 310, the e-business complex management services requester 510 of the vendors 330 behaves as a remote interface to Web services provided by the e-business complex management services 302. Through the e-business complex management services requester 510, the vendor 330 can establish a presence in the e-business complex 200 whose management can range from depending wholly on the e-business complex management services 302, to minimally depending on the e-business complex management services 302. In particular, the level of management provided by the e-business complex management services 302 can depend upon those services requested by the vendor 330 through the e-business complex management services requester 510.

As will be apparent to one skilled in the art, those services which can be requested by the vendor 330 through the e-business complex management services requester 510 can correspond to those vendor-oriented services provided by the service desks 350 of FIG. 3. Those vendor-oriented services can include, but are not limited to, store/vendor/professional service/business partner directory services and listing, merchandise exchanges and refunds, central business operations, shipping and handling services, shopper/vendor/professional service/business partner registration, professional service referrals, vendor referrals, financing and credit, payment processing, mail and messaging, and promotional marketing.

Like the e-business complex management services requester 410 of the store operators 310, the e-business complex management services requester 510 of the vendors 330 can communicate with the e-business complex management services 302 using conventional request/response communications, for example using the HTTP protocol. Specifically, the e-business complex management services requester 510 can pass requests for mall services received from the vendor kit 520 and can pass events received from the e-business complex management services 302 to the vendor kit 520.

Importantly, the vendor kit 520 can further bridge service request/response interactions to local databases 540 and local applications 530. Still, the invention is not limited in regard to the use of a e-business complex management services requester 510 to broker service requests between the e-business complex management services 302 and the vendor 330. Rather, in an alternative embodiment, an intermediary can be used in lieu of the e-business complex management services requester 510 to generate service requests on behalf of the vendor 330.

Figure 6:
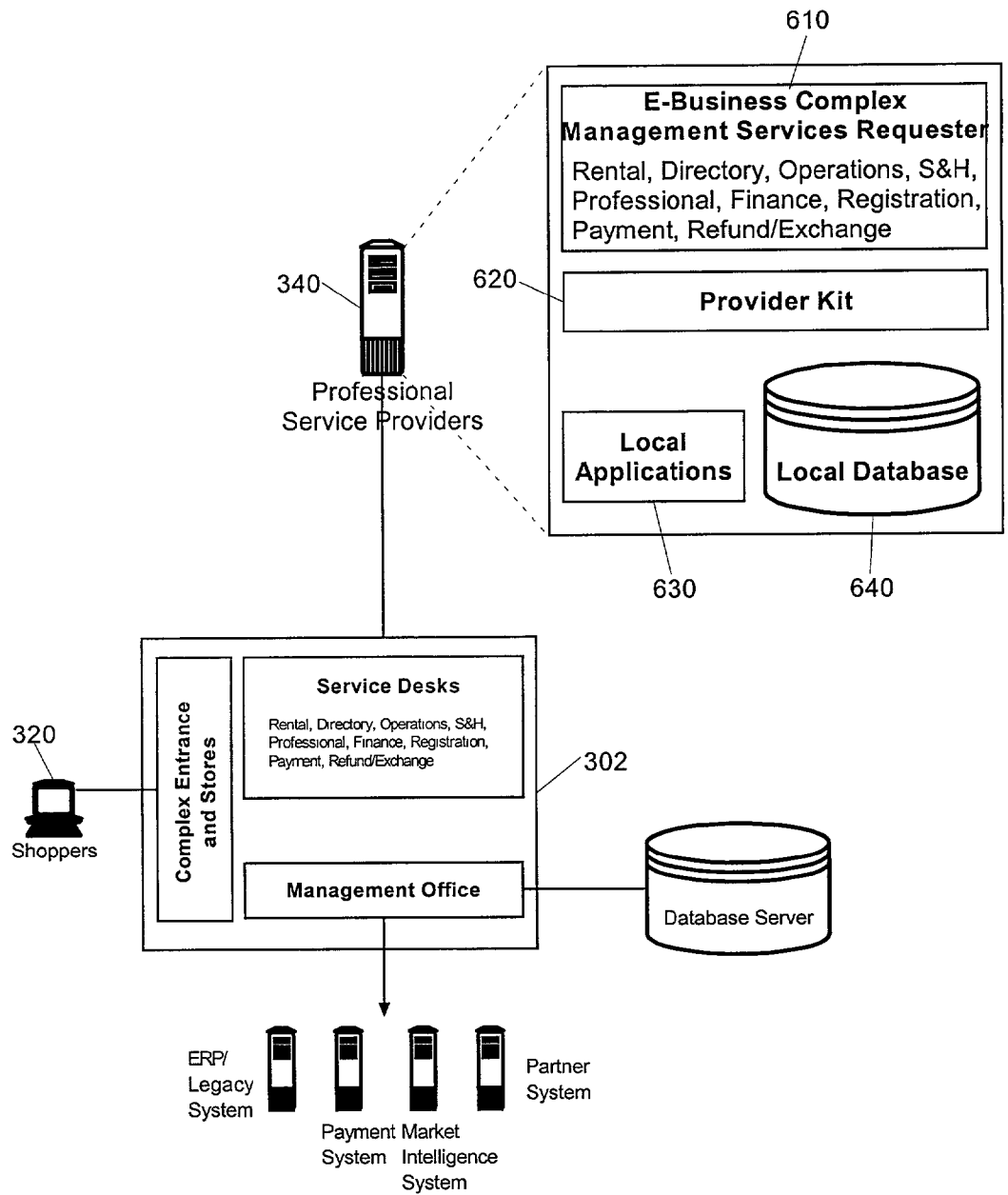
FIG. 6 is a schematic illustration of a virtual business partner loosely coupled to the e-business complex management services of FIG. 3; and, FIGS. 7A-7I, taken together, are event diagrams illustrating cooperative e-business processing in the e-business complex of FIG. 2.

Like the individual virtual stores 310 and the vendors 330 of the e-business complex 200, the individual professional service providers 340 and business partners 360, too, can be loosely coupled to one another through the e-business complex 200. FIG. 6 is a schematic illustration of a professional service provider 340 coupled to the e-business complex management services 302 of FIG. 3. As shown in FIG. 6, a professional service provider 340 can establish a loose coupling with the e-business complex management services 302 through the e-business complex management services requester 610. A provider kit 620 further can provide a user interface to the e-business complex management services requester 610. Finally, the provider kit 620 can provide a bridge between the e-business complex management services requester 610 and local applications 630 and databases 640.

The e-business complex management services requester 610 behaves as a remote interface to Web services provided by the e-business complex management services 302. Through the e-business complex management services requester 610, the professional service provider 340 can establish an e-business complex presence whose management can range from depending wholly on the e-business complex management services 302, to minimally depending on the e-business complex management services requester 302. In particular, the level of management provided by the e-business complex management services requester 302 can depend upon those services requested by the professional service provider 340 through the e-business complex management services requester 610.

As will be apparent to one skilled in the art, those services which can be requested by the professional service provider 340 through the e-business complex management services requester 610 can correspond to those professional services provider-oriented services provided by the service desks 350 of FIG. 3. Those services can include store/vendor/professional services provider/business partner directory services and listings, central business operations, contracting, shopper/vendor/professional service provider registration, professional service referrals, vendor referrals, financing and credit, payment processing, mail and messaging, and promotional marketing.

Advantageously, professional service providers 340 represent a new type of participant in the e-business complex in consequence of which individual professional service providers need not become intertwined with any one particular virtual stores, vendors, virtual mall or business partners of a virtual mall. Examples include store window designers, contract bidders, auctioneers, tax and accounting service providers, personal shoppers, professional buyers, home improvement designers, interior decorators, and expert advisors.

Like the mall services requester 410, 510 of the store operators and vendors 310, 330, the mall services requester 610 of the professional service provider 340 can communicate with the e-business complex management services 302 using conventional request/response communications, for example using the HTTP protocol. Specifically, the e-business complex management services requester 610 can pass requests for services received from the provider kit 620 and can pass events received from the e-business complex management services 302 to the provider kit 620.

Importantly, the provider kit 620 can further bridge service request/response interactions to local databases 640 and local applications 630. Still, the invention is not limited in regard to the use of a e-business complex management services requester 610 to broker service requests between the e-business complex management services 302 and the professional service provider 340. Rather, in an alternative embodiment, an intermediary can be used in lieu of the e-business complex management services requester 610 to generate service requests on behalf of the professional service provider 340.

Importantly, as each of the store operators 310, vendors, 320 and professional services providers 340 can interact with one another through the e-business complex management services requester 410, 510, 610, store operators 310, vendors 320 and professional services providers 340 can establish a presence within the e-business complex 200 without having to configure and maintain substantial infrastructure. Rather, the infrastructure can be cooperatively maintained centrally by the e-business complex management services 302 and can be accessed as need be by each individual store operators 310, vendor 320 and professional services provider 340 through their respective e-business complex management services requesters 410, 510, 610. In this way, only the respective e-business complex management services requester 410, 510, 610 and corresponding kit 420, 520, 620 need be deployed in the individual store operators 310, vendors 320 and professional services providers 340.

Importantly, the implementation of the e-business complex management services requesters 410, 510, 610 permit a loose-coupling of each of the store operators 310, vendors 330, professional service providers 340 and business partners 360 in the cooperative e-business complex 200. Hence, by distributing the e-business complex management services requesters 410, 510, 610 along with the kits 420, 520, 620, differing systems supporting each of the store operators 310, vendors 330, professional service providers 340 and business partners 360 can dynamically and fluidly engage and disengage from participation in the e-business complex by accessing services offered through the service desks 350 without requiring modification of the architecture of the e-business complex management services. In consequence, unlike simplistic prior art virtual mall architectures, true cross-business computing can be conducted in the cooperative e-business complex, regardless of the specific computing configurations of the respective participants.

FIGS. 7A-7I, taken together, are event diagrams illustrating loosely coupled, but cooperative e-business processing in the e-business complex 200 of FIG. 2. Beginning in FIG. 7A, a process for establishing a virtual store 204 in the cooperative e-business complex 200 is illustrated. Initially, the store operator 310 can contact the service desks 350 (mall rental service) and can request a virtual store 204. The mall rental service desk can access a rental catalog, offering plans, and service package options through the management office 370. The store operator 310 can select a store space and location, fee options and methods of operations. Notably, the methods of operations determine the level of mall involvement in operating the virtual store 204. The methods of operations can range from fully mall operated to heavily store oriented.

The management office 370 can maintain rental information in a catalog subsystem and can process a resulting rental contract in an ordering subsystem. If the store operator 310 requires the professional services of one or more professional service providers 340, such as an independent advertisement agency or a Web designer, a professional services referral can be provided to the store operator 310 as well. In addition, the management office can facilitate communications and resulting business transactions between the store operator 310, vendors 330 and the professional service providers 340.

Upon the execution of a store rental contract between the e-business complex 200 and the store operator 310, the store operator 310 can be provided with a store operator kit 420, either in a standalone desktop or Web page format. Business transactions and communications can be electronically conducted through the store operator kit 420. Examples of business transactions and communications electronically conducted through the store operator kit 420 can include submitting store window displays, configuring store operation settings, and submitting rental payments during the term of the virtual store rental. Notably, additional mall services and special mall promotions can be requested either before or after the virtual store 204 has been established in the e-business complex 200.

During the process of establishing the virtual store 204, the store operator 310 further can describe the capabilities of the virtual store 204. For instance, the store operator 310 can describe merely a basic store category and a catalog of the goods or services which are provided through the virtual store 204. Alternatively, the virtual store 204 can be provide a categorization not only of the store, but also of the goods or services provided through the virtual store 204. In this way, a thorough search can be made of all products and services sold through the virtual stores 204 of the e-business complex 200 rather than just a single virtual store 204.

Figure 7A:
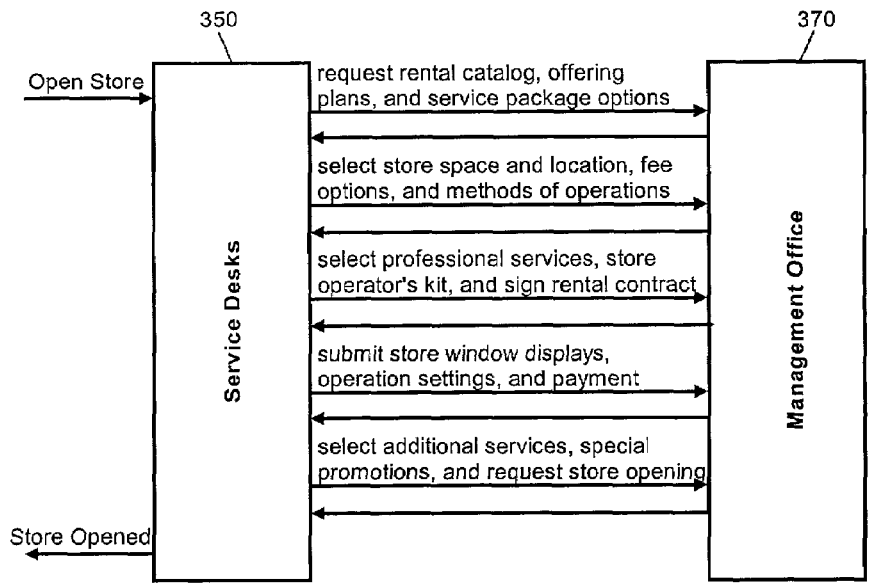
Figure 7B:
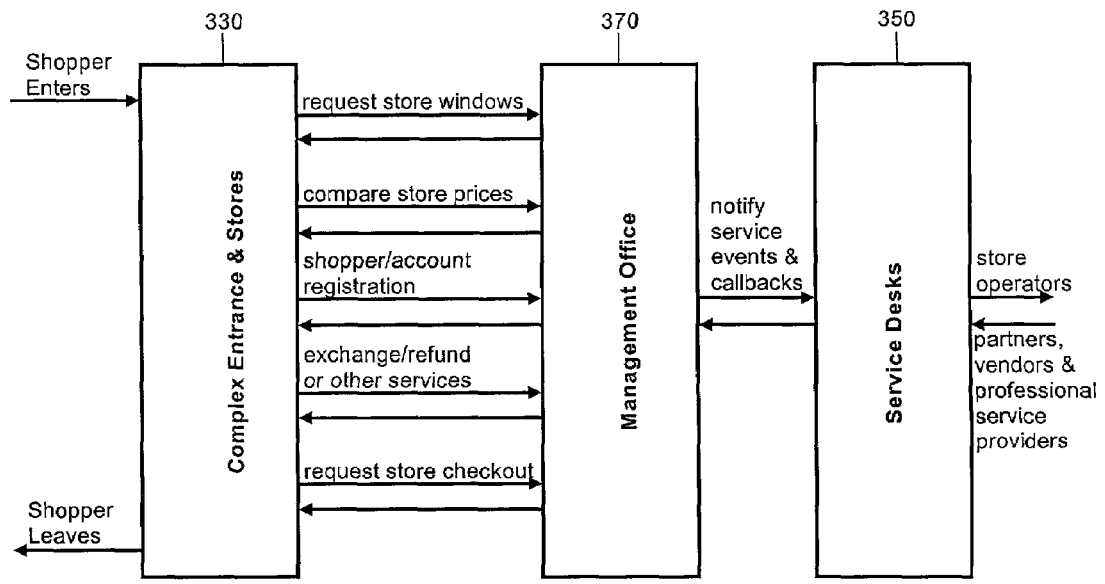

FIG. 7B illustrates a process for handling shopping in an established virtual store 204 in the e-business complex 200. In accordance with the inventive arrangements, the e-business complex 200 can provide "curb appeal" and common entry to the virtual stores 204 in the e-business complex 200 which can result in a pleasant and consistent shopping experience for shoppers. The management office 370 through the operations service of the service desks 350 can handle all interactions between shoppers and virtual stores 204, including, but not limited to window browsing, price comparison, shopper registration, charge account application, check-out, and refund/exchange. Thus, the management office 370 of the e-business complex 200 can relieve each individual virtual store 204 from having to perform such back-end processing.

The e-business complex 200 can automate associated transactions in the shopping flow and can notify selected store operators 310, vendors 330 and professional service providers 340 of specially related service events through the service desks 350. In particular, the e-business complex 200 can notify the store operators 310, vendors 330 and professional service providers 340 of such events on an exception basis. Moreover, to preserve communications efficiency, where possible such notifications can occur asynchronously. For example, where credit verification is required prior to processing a purchase transaction, synchronous processing will be required. Conversely, where an exchange/request event has occurred, merely asynchronous event notification will be required to determine shipping and handling before generating a shipping ticket.

Figure 7C:
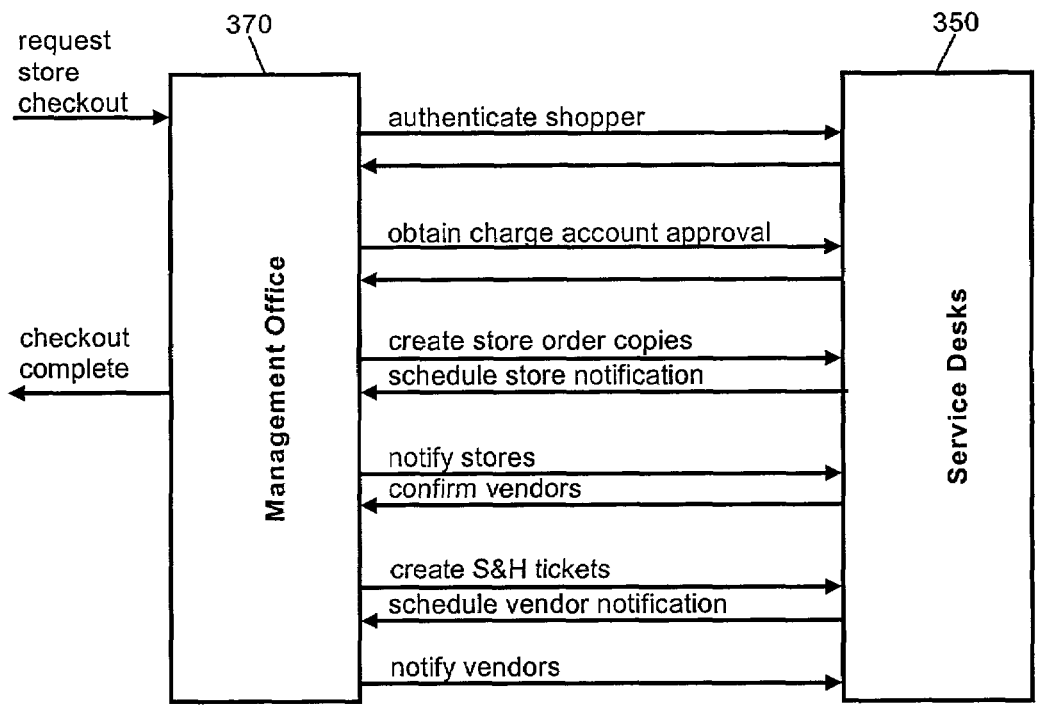

FIG. 7C illustrates a process for handling an order for a shopper on behalf of a virtual store 204. The operations service of the service desk 350 can drive the order process. During the order process, optionally, the e-business complex 200 can request shopper authentication from the service desk 350 prior to performing credit card processing. Interactions between the virtual mall 200 and the store operator 210 associated with the virtual store 204 can commence upon the occurrence of a check-out event. Notably, as will be apparent to one skilled in the art, the operations service can automate the order process while providing a continuous transaction flow for each party participating in the transaction—a consequence which is uncharacteristic of conventional e-commerce transaction processing systems.

In that regard, unlike the real-time order processing of conventional e-commerce systems, in the present invention, at prescheduled intervals the e-business complex 200 can begin order processing automatically according to a predefined setting. The e-business complex 200 can notify the store operator 310 about newly received orders. At that time, the store operators 310 optionally can process the order further through such operations as maintaining log entries of orders, and modifying the pre-configured process settings for instance changing vendors 330 for particular products in the order, and changing shipping and handling options for the order. These functions can be performed off-line in the store operator 310.

Once the local processing has completed, the order processing can resume within the e-business complex 200. Specifically, the vendors 330 can be notified of the order, and shipping and handling tickets can be generated in a shipping and handling service of the service desk 350 when all of the vendors 330 have prepared the necessary goods and services for shipment. Importantly, while conventional vendors undertake substantial processing to give the appearance that the ordered goods are provided directly by the store operator and not by the individual vendors charged with fulfilling an order, in the present invention, that processing is provided by the e-business complex 200. The vendors 330 need only wait for the receipt of a shipping and handling label from the e-business complex 200.

The store operator kit 420 can include additional wrappers for accessing common office suites, database management systems and transaction processing systems which store operators 310 might use for processing shopper orders. Notably, the invention is not limited to batch processing of shopper orders. Rather, in an alternative embodiment, store operators 310 can activate real-time order processing when establishing a virtual store 204 in the e-business complex 200. Specifically, while in many cases the batch processing of shopper orders can be adequate, in many cases real-time ordering is required. Examples include grocery stores, on-line restaurants, and the like where delivery timing is important. Thus, to provide real-time order processing, the store operator 310 can configure the processing interval to "immediate".

When defining the virtual store 204 to the e-business complex 200 as illustrated in FIG. 7A, a customizable order processing service included in the store operator 310 can be registered with the management office 370. When the e-business complex 200 processes an order requesting goods or services from that virtual store 204, the management office 370 can invoke the order processing service included in the store operator 310 allowing immediate fulfillment of the order rather than waiting for some time for the pre-determined notification interval.

Figure 7D:
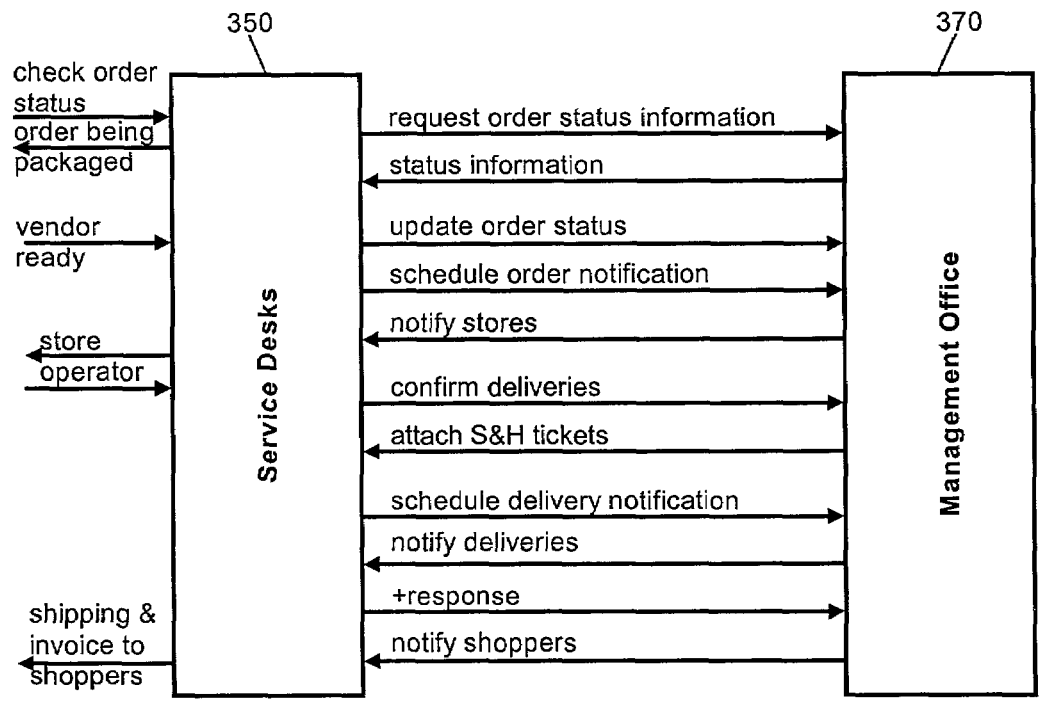

FIG. 7D illustrates a process for delivering ordered products and services on behalf of the virtual stores 204. Specifically, the operations service of the service desk 350 periodically can check the status of an order with the vendors 330. When individual vendors 330 prepare an order for shipment, the individual vendors 330 can notify the e-business complex 200 which, in turn, can notify the store operators 310 that the individual vendor 330 has readied the order. As before, the store operators 310 can perform further processing. When all of the products in the order are ready, shipping and handling labels can be generated and forwarded to the vendors 330. Additionally, a delivery service can schedule a pickup for the ordered goods. Finally, upon positive acknowledgment from the delivery service, the shopper can be notified of the shipment and can be invoiced.

Figure 7E:
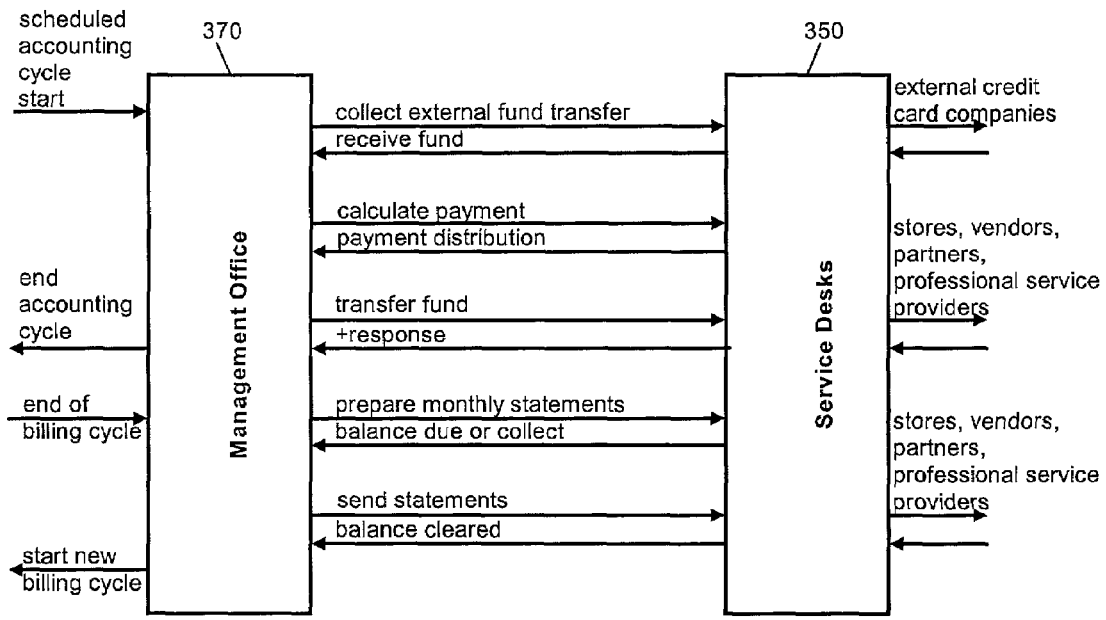

FIG. 7E illustrates a process for handling billing and payment for orders on behalf of individual virtual stores 204. At each accounting cycle, the management office 370 can collect funds from credit card companies and internal mall accounts associated with sales transactions. Subsequently, the management office 370 can redistribute the collected funds to each party to the transaction, albeit after a pre-arranged escrow withholding. The distribution can be performed according to a calculation of payments based upon actual revenue and the costs logged by the respective virtual stores 204 during the accounting period.

For example, the payment distribution allocated to a particular virtual store 204 could include the difference between the total sales and the cost of the merchandise sold on behalf of the virtual store 204. The cost base further can include, for instance, the price charged by the vendors 330 for the merchandise, a nominal service charge imposed by the e-business complex 200, a mall rental fee, an operations fee and the like. Notably, in a transaction between two parties in the e-business complex 200, for example a vendor 330 and a store operator 310, one party's cost could result in another party's distributed payment.

Optionally, an accounting and tax service can be provided as a professional service to the store operators 310, vendors 330 or other professional service providers 340. In that regard, at the end of a billing cycle, accounting and financial statements can be generated by the accounting and tax service. Subsequently, the statements can be forwarded through the operations desk of the service desk 350 to the store operators 310, vendors 330 or professional service providers 340 as the case may be.

Figure 7F:
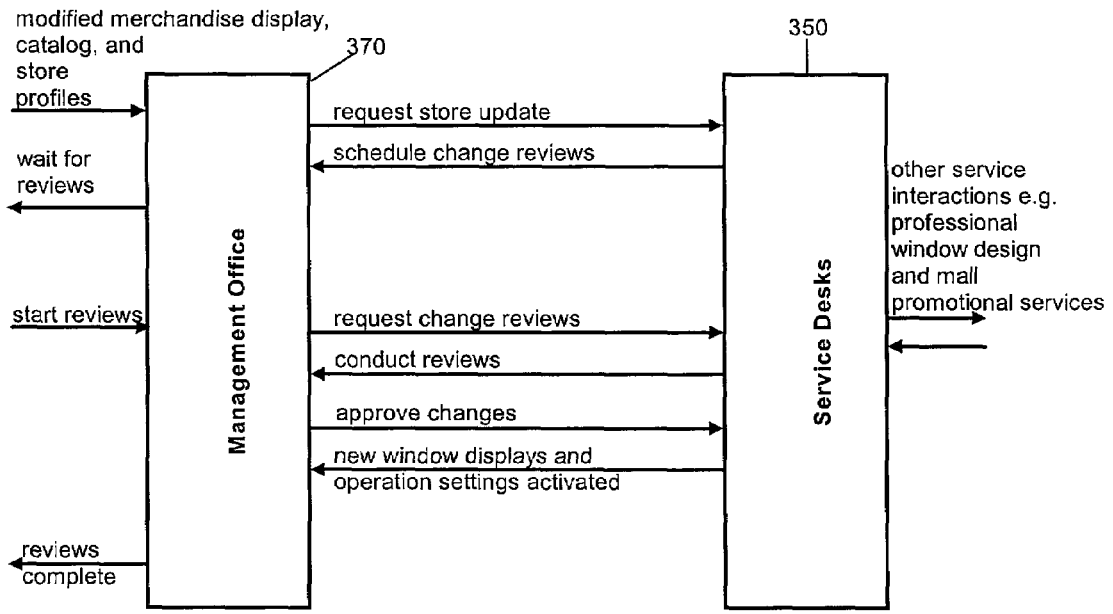

FIG. 7F illustrates a process for changing the on-sale merchandise for a virtual store 204 on behalf of an associated store operator 310. In particular, the store operator 310 can change the merchandise held for sale in the e-business complex 200, along with its corresponding window displays, by forwarding to the operations service in the service desk 350 a new merchandise catalog, window displays and vendor information. Importantly, the store operator 310 can utilize the professional services of a window display design professional services provider via the management office 370 in preparing the window displays. In any case, upon receipt of the new catalog and displays, the operations service of the service desk 350 can schedule a review of the changes before activating the same.

Figure 7G:
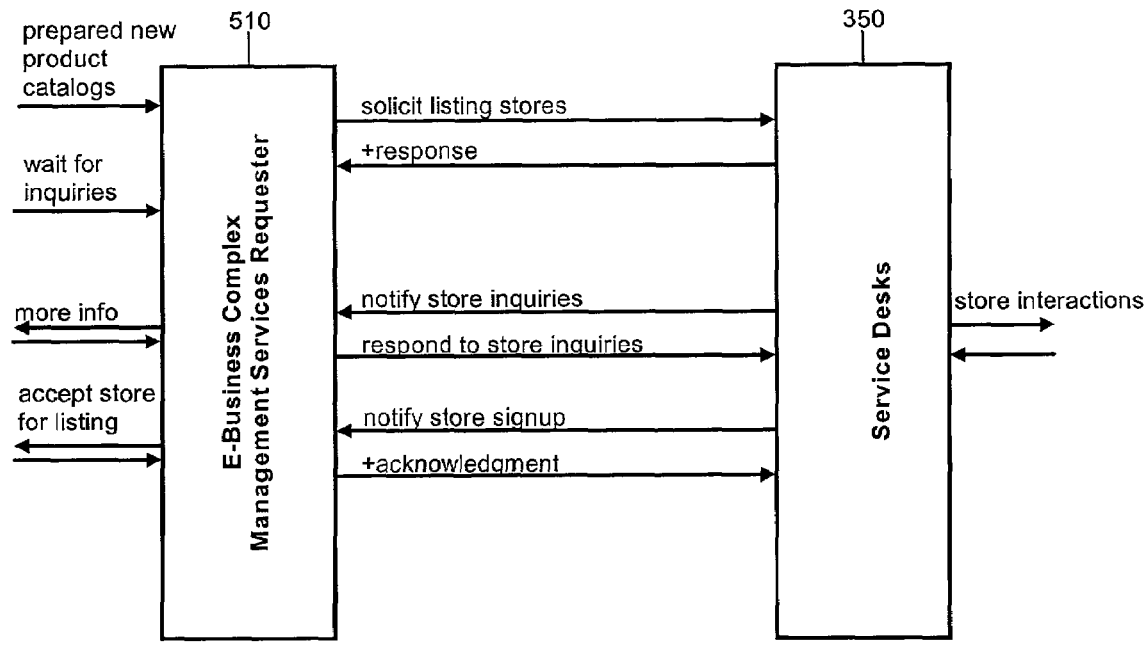

FIG. 7G illustrates a process for the promotion of the new products of a vendor 330 in the e-business complex 200 of the present invention. The vendor 330 can promote new merchandise by sending the new merchandise catalog to the mall operations service in the service desks 350. In consequence, the service desks 350 can notify individual virtual stores 204 of the new product offering. The product can be promoted in the e-business complex through several schemes, including online vendor fairs, auctioning and reverse auctioning, a vendor promotions display portion of the e-business complex, or through direct electronic mailings. In this way, the e-business complex 200, itself, can become the sales force of each participating vendor 330.

Figure 7H:
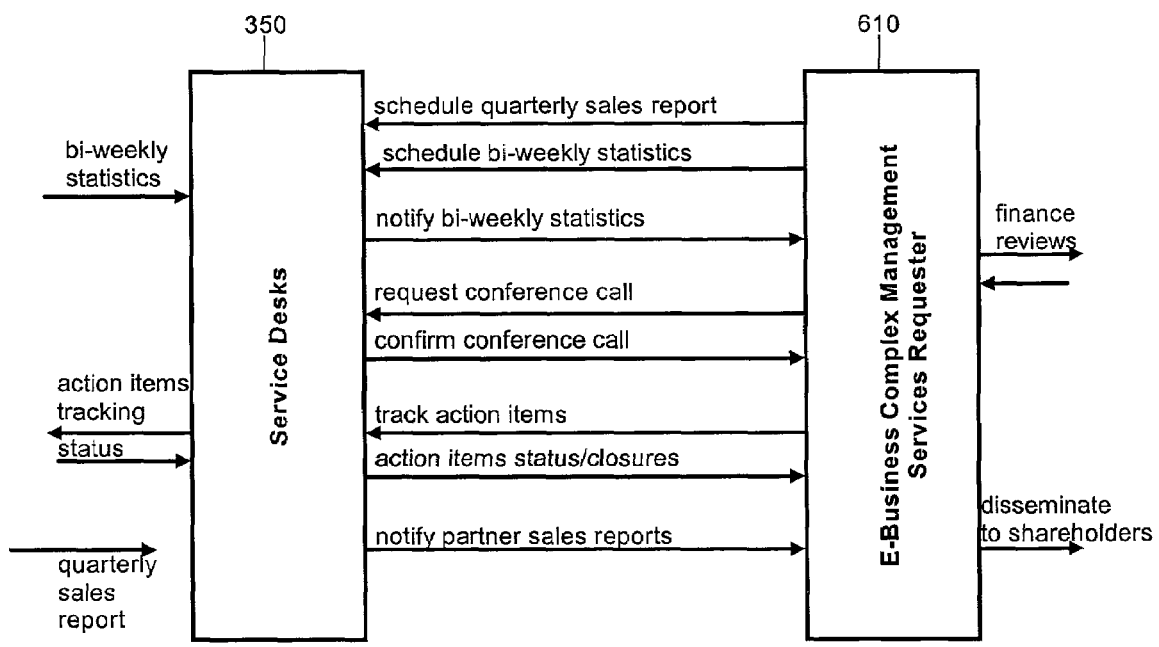

FIG. 7H illustrates a process for a business partner 360 to review the financial data produced in the e-business complex. In particular, the business partner 360 can register with the e-business complex 200 for a periodic reviewing of the financial data. In consequence, both bi-weekly and quarterly sales reports, for example, can be forwarded to the business partner 360 when available. Upon receipt of the financial reporting data, the business partner 360 can request a conference call to discuss the data. Action items produced by the conference call can be docketed for status tracking and the status can be reported periodically to the business partner 360.

Figure 7I:
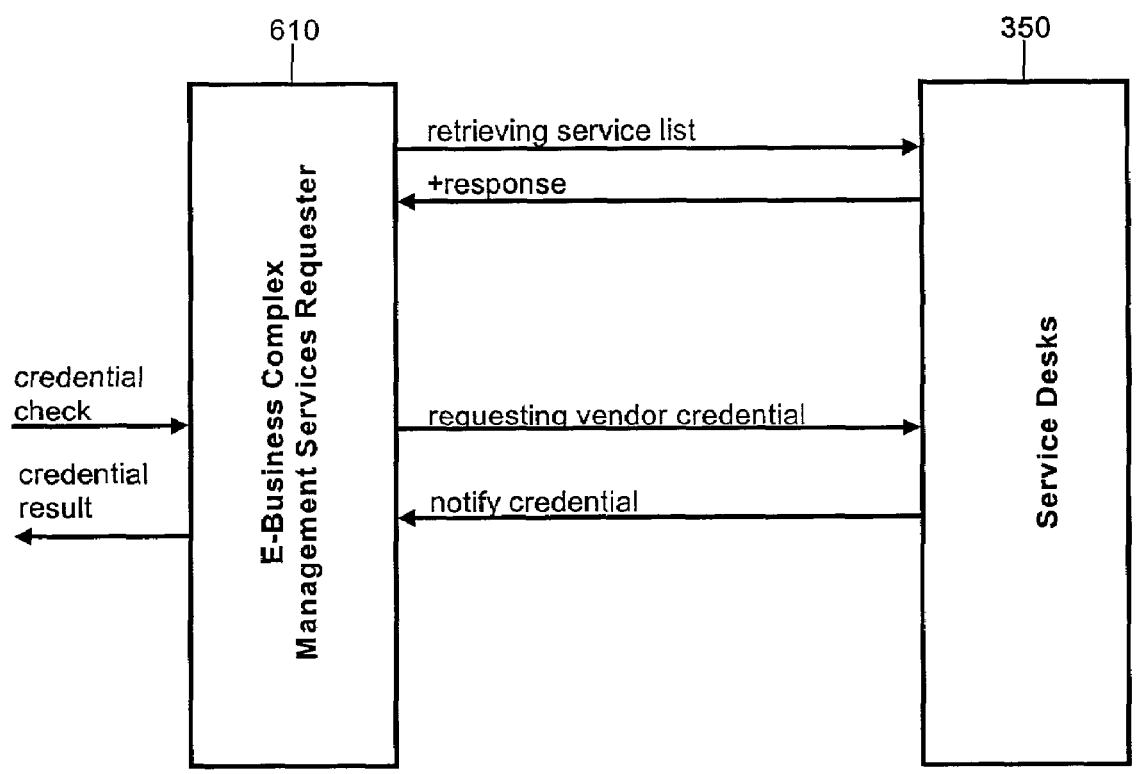

FIG. 7I illustrates a process for facilitating transactions between two virtual malls in the e-business complex 200 of the present invention. Though many types of transactions can be processed between two virtual malls, including inventory trading, spill-over order processing, credit verification, shopper behavior analysis, and automatic shopper re-direction, in the exemplary transaction shown in FIG. 7I, a vendor 330 contracted with a first virtual mall can have the vendor credentials verified by a second mall. Specifically, the second mall can request a list of partner services from the services desk 350 of the first mall to ensure that a vendor credential service is an available service which can be accessed through the service desks 350. Subsequently, the second mall can request a credential check of a specific vendor 330. The first mall can retrieve a trading history associated with the specific vendor 330 and can generate a credential report. Finally, the credential report can be forwarded to the second mall.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of cooperatively processing e-business transactions in an e-business complex comprising the steps of:
- registering a plurality of virtual store operators with the e-business complex, each said registration establishing a virtual store in the e-business complex;
- providing to individual ones of on-line shoppers in the e-business complex, window displays of products offered for sale by virtual stores in the e-business complex, and accepting shopper orders for said products from said individual on-line shoppers;
- notifying selected store operators of said shopper orders, said selected store operators operating virtual stores in the e-business complex which correspond to said products ordered by said on-line shoppers;
- notifying selected vendors of said shopper orders, said selected vendors supplying said products offered for sale by said selected store operators;
- fulfilling said shopper orders with said products supplied by said selected vendors; collecting payments for said shopper orders from said on-line shoppers and distributing portions of said payments to each of said vendors and said store operators;
- providing to said store operators a catalog of professional services offered for sale by associated professional services providers; and,
- brokering at least one transaction for at least one of said professional services between at least one of said store operators and at least one of said professional service providers.

2. The method of claim 1, wherein said fulfilling step comprises the step of:
- notifying said selected vendors of said shopper orders wherein each said shopper order specifies products supplied by said selected vendors;
- producing shipping and handling labels for each of said specified products; and,
- forwarding said shipping and handling labels to said selected vendors only when said selected vendors are ready to ship all of said specified products.

3. The method of claim 1, further comprising the steps of:
- brokering tax and accounting services between a tax and accounting business partner and individual ones of said store operators; and,
- forwarding tax and accounting statements produced by said business partner to said individual ones of said store operators.

4. A machine readable storage having stored thereon a computer program for cooperatively processing e-business transactions in an e-business complex, said computer program comprising a routine set of instructions for causing the machine to perform the steps of:
- registering a plurality of virtual store operators with the e-business complex, each said registration establishing a virtual store in the e-business complex;
- providing to individual ones of on-line shoppers in the e-business complex, window displays of products offered for sale by virtual stores in the e-business complex, and accepting shopper orders for said products from said individual on-line shoppers;
- notifying selected store operators of said shopper orders, said selected store operators operating virtual stores in the e-business complex which correspond to said products ordered by said on-line shoppers;
- notifying selected vendors of said shopper orders, said selected vendors supplying said products offered for sale by said selected store operators;
- fulfilling said shopper orders with said products supplied by said selected vendors; and,
- collecting payments for said shopper orders from said on-line shoppers and distributing portions of said payments to each of said vendors and said store operators;
- providing to said store operators a catalog of professional services offered for sale by associated professional services providers; and,
- brokering at least one transaction for at least one of said professional services between at least one of said store operators and at least one of said professional service providers.

5. The machine readable storage of claim 4, wherein said fulfilling step comprises the step of:
- notifying said selected vendors of said shopper orders wherein each said shopper order specifies products supplied by said selected vendors;
- producing shipping and handling labels for each of said specified products; and,
- forwarding said shipping and handling labels to said selected vendors only when said selected vendors are ready to ship all of said specified products.

6. The machine readable storage of claim 4, further comprising the steps of:
- brokering tax and accounting services between a tax and accounting business partner and individual ones of said store operators; and,
- forwarding tax and accounting statements produced by said business partner to said individual ones of said store operators.

* * * * *